(12) United States Patent
Wright et al.

(10) Patent No.: US 7,413,194 B2
(45) Date of Patent: Aug. 19, 2008

(54) PRESSURE BALANCED ANNULAR SEAL

(75) Inventors: Christopher Wright, Bristol (GB); Gervas Franceschini, Exeter (GB)

(73) Assignee: Rolls-Royce PLC, London (GB)

( * ) Notice: Subject to any disclaimer, the term of this patent is extended or adjusted under 35 U.S.C. 154(b) by 84 days.

(21) Appl. No.: 11/258,183

(22) Filed: Oct. 26, 2005

(65) Prior Publication Data

US 2006/0208427 A1  Sep. 21, 2006

(30) Foreign Application Priority Data

Oct. 28, 2004 (GB) ................................ 0423923.2

(51) Int. Cl.
*F16J 15/44* (2006.01)
*F16J 15/00* (2006.01)

(52) U.S. Cl. ................ 277/355; 277/422; 277/431; 277/579; 277/580; 277/581

(58) Field of Classification Search ............... 277/355, 277/543–545, 548, 581, 422, 431, 579, 580
See application file for complete search history.

(56) References Cited

U.S. PATENT DOCUMENTS

| | | | | |
|---|---|---|---|---|
| 4,756,536 | A * | 7/1988 | Belcher ................... | 277/355 |
| 5,799,952 | A * | 9/1998 | Morrison et al. .......... | 277/355 |
| 6,065,754 | A * | 5/2000 | Cromer et al. ............ | 277/412 |
| 6,168,162 | B1* | 1/2001 | Reluzco et al. ............ | 277/355 |
| 6,173,962 | B1* | 1/2001 | Morrison et al. .......... | 277/355 |
| 6,244,599 | B1* | 6/2001 | Braun et al. .............. | 277/355 |
| 6,267,381 | B1* | 7/2001 | Wright ..................... | 277/355 |
| 6,293,554 | B1* | 9/2001 | Dinc et al. ................ | 277/355 |
| 6,367,806 | B1* | 4/2002 | Turnquist et al. .......... | 277/355 |
| 6,565,094 | B2* | 5/2003 | Wright et al. ............. | 277/355 |
| 6,572,115 | B1 | 6/2003 | Sarshar et al. | |
| 6,669,203 | B1 | 12/2003 | Mortaheim | |
| 6,695,314 | B1 | 2/2004 | Gail et al. | |
| 7,066,468 | B2* | 6/2006 | Uehara et al. ............. | 277/355 |

(Continued)

FOREIGN PATENT DOCUMENTS

GB    2393766 A  *  4/2004

(Continued)

*Primary Examiner*—Patricia Engle
*Assistant Examiner*—Gilbert Y Lee
(74) *Attorney, Agent, or Firm*—Oliff & Berridge, PLC

(57) ABSTRACT

This invention provides a segmented annular seal (10) the sealing leakage gaps between relatively movable components 14,16 between high and low pressure regions in a gas turbine engine, for example for sealing an engine shaft 16. The seal comprises an annular array of circumferentially spaced and radially movable arcuate seal segments (12) which extend in a continuous end to end relationship in annular housing (14) and project radially from the housing for effecting a seal against an engine shaft (16), rotor or the like. The segments (12) are located in a channel (22) in the housing (14) sized such that the segments (12) are able to follow radial movements of the shaft (16). In order to reduce an axial loading on the segments (12) that ends to cause them to seize a pressure balance region (30) vented to the upstream pressure region is formed on the downstream side of the segments (12). A second pressure balance region (42) vented to the downstream pressure region may be formed on the upstream side of the segments (12) to relieve a twisting moment acting on the segments.

10 Claims, 3 Drawing Sheets

U.S. PATENT DOCUMENTS

| | | | |
|---|---|---|---|
| 2002/0063391 A1* | 5/2002 | Kono | 277/355 |
| 2002/0105145 A1* | 8/2002 | Aksit et al. | 277/355 |
| 2002/0105146 A1* | 8/2002 | Uehara et al. | 277/355 |
| 2002/0140175 A1* | 10/2002 | Kono | 277/355 |
| 2005/0206087 A1* | 9/2005 | Hogg et al. | 277/355 |
| 2006/0033285 A1* | 2/2006 | Nishimoto et al. | 277/355 |

FOREIGN PATENT DOCUMENTS

| | | |
|---|---|---|
| JP | A 11-257013 | 9/1999 |

* cited by examiner

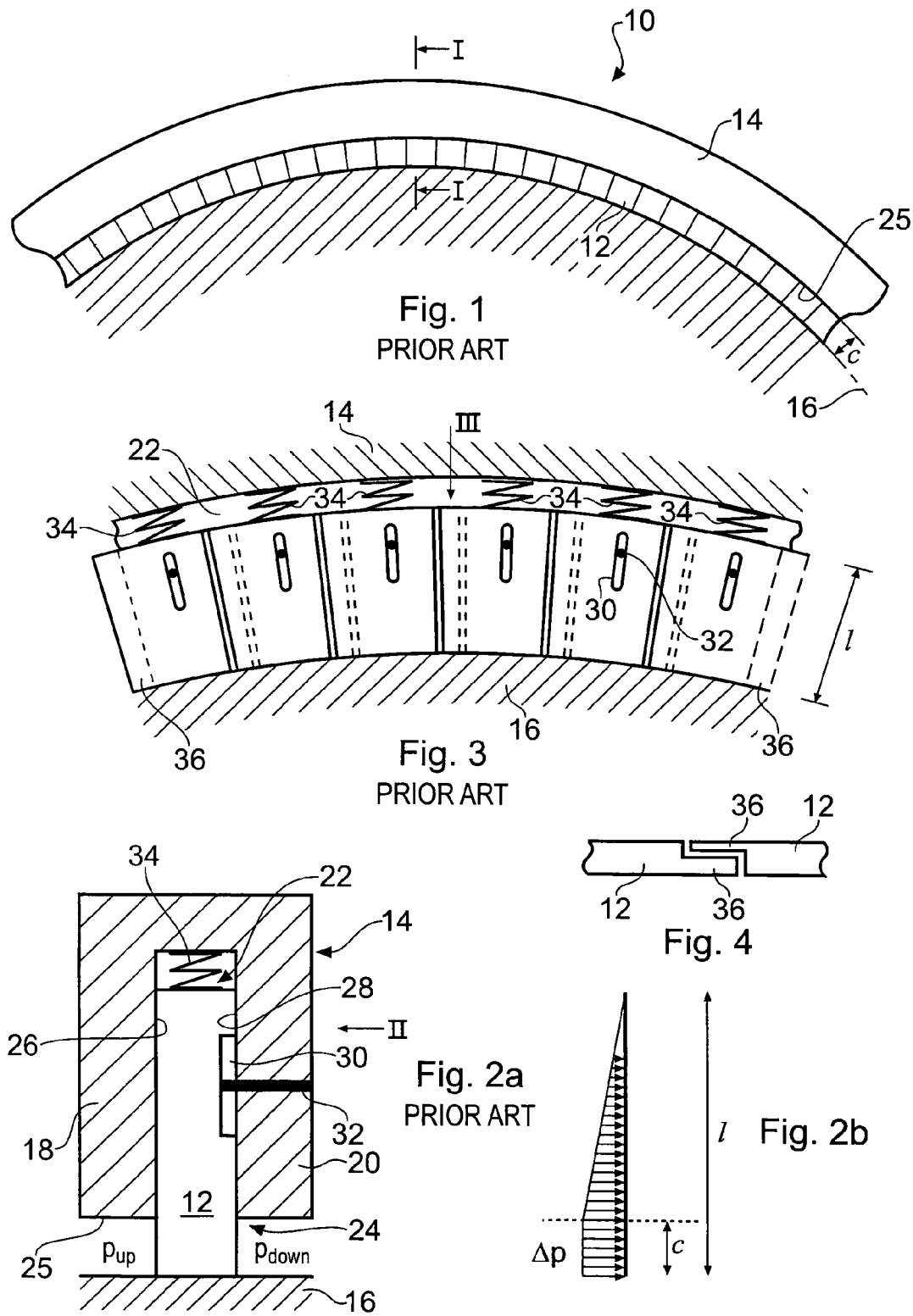

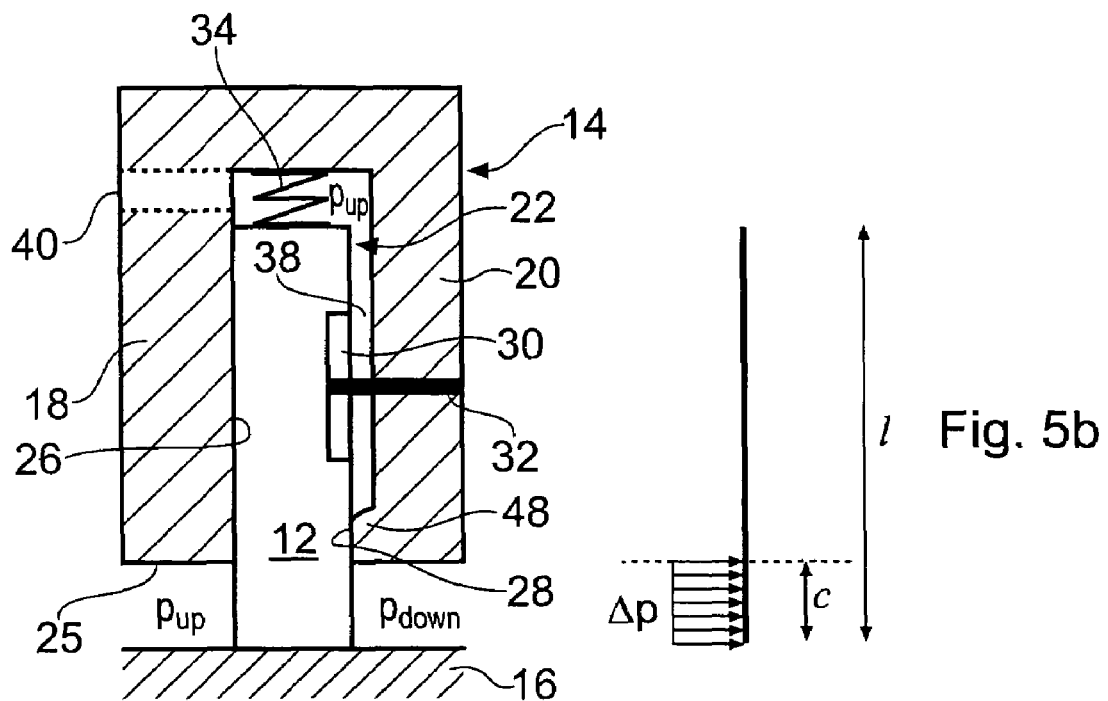
Fig. 5a
Fig. 5b
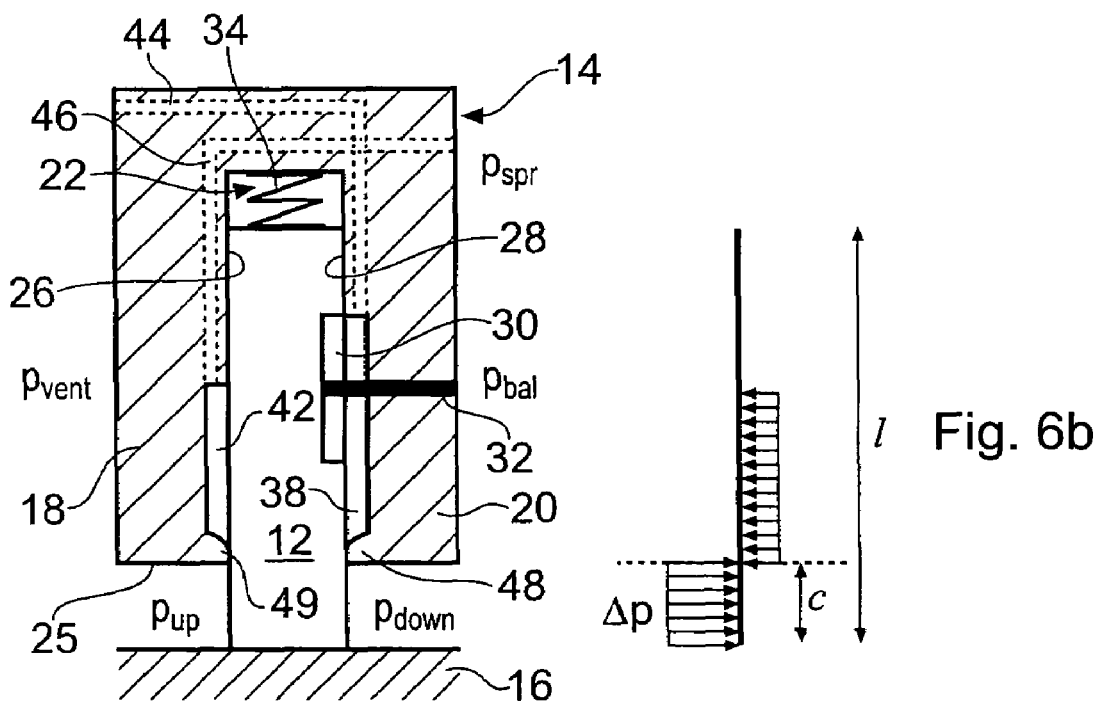
Fig. 6a
Fig. 6b

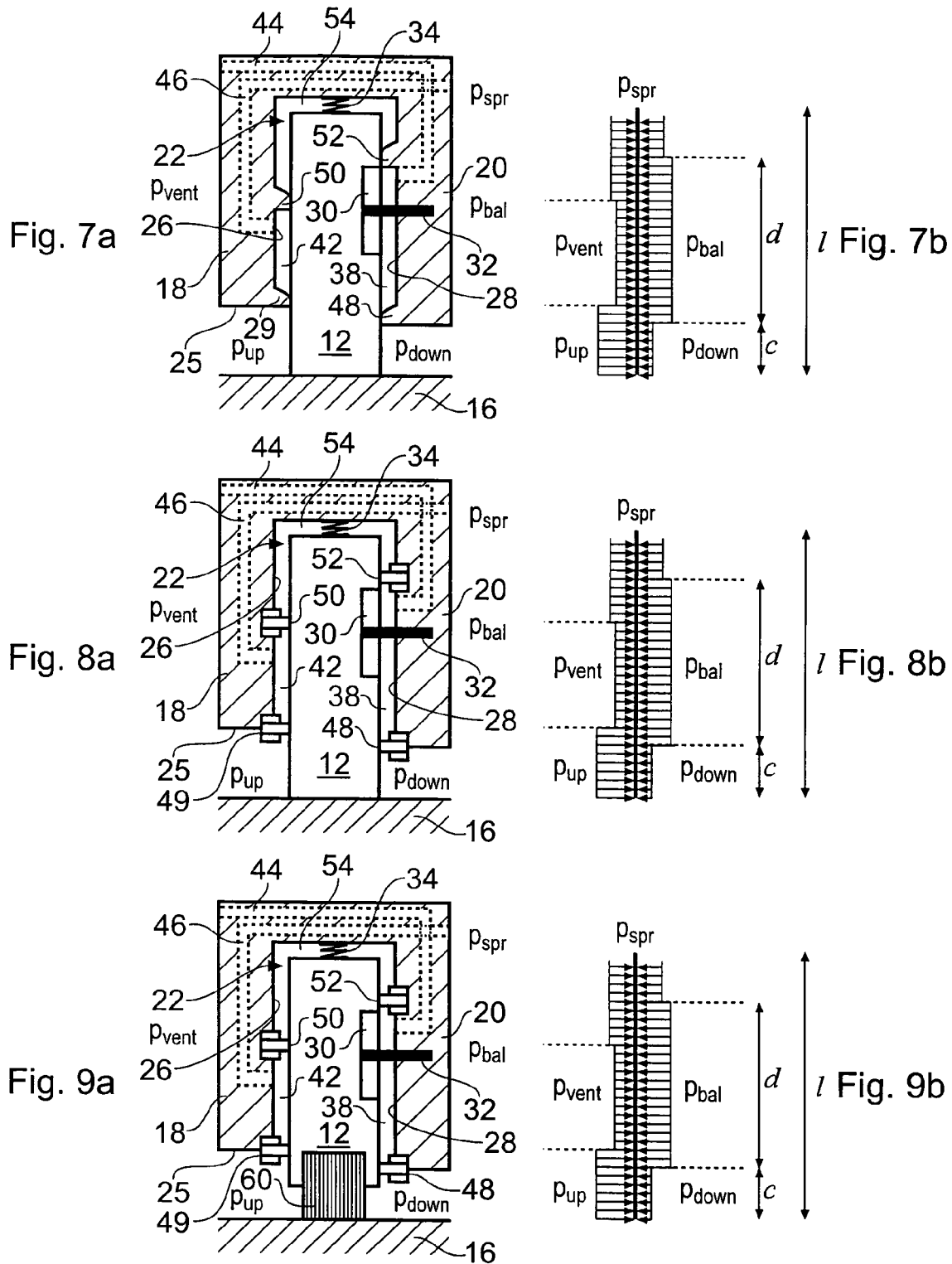

PRESSURE BALANCED ANNULAR SEAL

BACKGROUND

This invention relates to a pressure balanced annular seal. In particular the invention concerns a segmented annular seal assembly for sealing between relatively movable components in a gas turbine engine.

The invention has for a principal objective the reduction or elimination of pressure loading on seal segments in the direction of main gas flow by use of pressure balance features acting in the opposite direction to the main direction of gas flow.

The relatively movable components of the present invention are commonly relatively rotatable, but in this case movable is intended to embrace lateral or transverse movement as well as rotational movement. It will be understood that, in use, a turning shaft, rotor or the like may also be subject to a certain amount of lateral or transverse movement. Therefore it will be understood also that such a seal will be effective even when the shaft rotor or the like is rotationally stationary.

A segmented annular seal assembly is known from U.S. Pat. No. 6,669,203 in which a plurality of arcuate brush seal segments are disposed in a radially inwardly opening groove of a stationary component to engage the surface of a relatively rotating component. Each brush seal segment has limited radial and axial clearances with respect to the fixed housing provided by a hook or flange carried on the upstream side of each segment engaged with a slot formed in the housing. A spring is disposed between the segment and the base of the groove and biases the seal segments towards the rotating component so as to follow radial movements. It is claimed that this arrangement permits at start up high pressure flow on the upstream side to bias the segments in an axial downstream direction and also permits the high pressure to enter into the base of the groove and the radially outer face of the segments to bias the segment radially inwardly to ensure proper sealing of the bristle tips along the rotor surface.

However, a disadvantage of the arrangement is that friction between the downstream faces of the segments and the downstream wall of the groove due to the high pressure on the upstream side can cause the segments to stick to the wall and fail to track radial excursions of the rotor leading to increased seal leakage. This can lead to uneven and excessive seal wear, and it is impracticable to employ a bias force sufficient to overcome the sticking force as it would increase seal wear to unacceptable levels.

In U.S. Pat. No. 6,572,115 a segmented seal is mounted in a seal carrier which is movable in radial directions to accommodate radial transients. The seal carrier segments are disposed in a channel creating a space on the radially outer side of the segments to which upstream pressure is supplied thereby create a bias force acting radially downwards to bias the seal portions into contact with the rotor. However, the structure of the embodiments disclosed exposes the upstream facing faces of the movable seal parts to upstream pressure, and the downstream facing faces of the movable seal parts to downstream pressure. Consequently the seal carrier segments are subject to a tilting force as a result of the difference in pressure between the upstream and downstream sides. This may lead to the segments jamming in the channel so that they cannot follow radial transient movements and suffer uneven and premature wear as a result.

In such prior art arrangements as these shaft seal segments which slide (radially in the case of axial flow, axial in the case of radial flow) suffer from high contact loading associated with the net pressure differential across them. The imbalance in pressure across the seal causes a net force in the direction of fluid flow. The segments then seize against the retaining plate/ring and segment movement is either very difficult or prohibited. The additional forces required to move the segments manifest themselves as higher loading between the seal and a relatively rotatable part or a static structure, in the case of a static seal. Where there is relative movement high wear results.

SUMMARY

The present invention is concerned with improving the performance of a seal between regions of different pressure, for example: to prevent oil leakage from the engine bearing chambers in gas turbine engine. Such seals require a degree of radial compliance to accommodate transient radial excursions, for example, due to shaft and/or rotor eccentricities and/or radial growth due to centrifugal forces and/or differential temperatures. The invention concerns pressure-balancing means to offset the pressure loading on components of the seal in the direction of fluid flow. Lower forces result and the segments are then able to move with relative ease, much improving the overall life of the seal.

The primary sealing mechanism, that is the type of components that provide the seal between relatively movable parts, is not crucial to the present invention. So the primary seal, for example, may comprise a brush seal, an abradable face seal, an air riding seal, leaf seals and the like or any other type of suitable seal.

According to an aspect of the present invention, there is provided a segmented annular seal assembly for sealing a leakage gap between regions of different pressure comprising a fixed part and a relatively rotatable movable part, the fixed part and the movable part being formed to define between them the leakage gap between an upstream region of high pressure and a downstream region of lower pressure, an annular seal ring disposed to seal the leakage gap, the seal ring consisting of a plurality of arcuate seal segments carried by the fixed part within a recess formed with an upstream wall and a downstream wall within which the seal segments are carried, the upstream wall and the downstream wall being spaced apart such that the ring segments are free to follow movement of the movable part relative to the fixed part, characterised in that there is provided a first pressure balance region formed adjacent the downstream wall and the seal ring and communication means linking the pressure balance region with the upstream pressure region on the upstream side of the fixed part whereby to tend to equalise pressure in said regions.

The annular seal of the present invention readily enables a radially compliant seal to be provided in a gas turbine engine for effecting a seal against a rotatable or stationary engine shaft or engine rotor assembly. The radially movable primary seal segments are slidably located in the housing so that they are capable of accommodating significant radial interference due to shaft and/or rotor eccentricities and/or radial growth due to centrifugal loads and/or differential thermal expansion. The biasing force provided by the biasing means is preferably great enough to maintain the primary seal segments in contact with the shaft or other component being sealed with minimum contact force so that the segments are radially movable with minimum force to minimise wear of the components due to the contact load. Circumferential movement of the primary seal segments is restrained by the guide means to prevent circumferential movement of the segments in the housing.

BRIEF DESCRIPTION OF THE DRAWINGS

The invention and how it may be carried into practice will now be more particularly described, by way of example only, with reference to the accompanying drawings, in which:

FIG. 1 is an end view of an annular segmented seal of known type viewed in the axial direction of the seal;

FIG. 2a is a cross-section view of the seal of FIG. 1 along the line I-I of FIG. 1;

FIG. 2b is a diagram illustrating the pressure forces acting on the seal components in use;

FIG. 3 shows in more detail a plurality of seal segments of the seal of FIGS. 1 and 2, viewed in the direction II in FIG. 2;

FIG. 4 shows the overlapping arrangement of the circumferential ends of adjacent segments viewed in the direction of III in FIG. 3;

FIG. 5a is a cross-section view similar to FIG. 2a of a seal in accordance with the present invention having a downstream pressure balance region;

FIG. 5b is a diagram illustrating the pressure forces acting in use on the seal components of FIG. 5a;

FIG. 6a is a cross-section view similar to FIG. 2a of a seal in accordance with the present invention having downstream and upstream pressure balance regions;

FIG. 6b is a diagram illustrating the pressure forces acting in use on the seal components of FIG. 6a;

FIG. 7a is a cross-section view similar to FIG. 6a of a seal in which the downstream and upstream pressure balance regions are defined by a first form of secondary seals within the seal receiving channel;

FIG. 7b is a diagram illustrating the pressure forces acting in use on the seal components of FIG. 7a;

FIG. 8a is a cross-section view similar to FIGS. 6a and 7a in which the downstream and upstream pressure balance regions are defined by an alternative form of secondary seals within the seal receiving channel;

FIG. 8b is a diagram illustrating the pressure forces acting in use on the seal components of FIG. 8a; and FIG. 9 is a cross-section view similar to FIGS. 7a and 8a of a seal in accordance with the present invention having an alternative form of primary seal.

EMBODIMENTS

In the following description the terms: primary seal is used in reference to the seal against the rotating shaft (i.e., the original sealing interface); and secondary seal is used in reference to the low duty seals located between the static seal (segments) and the static seal housing.

Referring now to the drawings, in which like parts carry like references, in FIG. 1 there is shown part of the circumference of an annular segmented primary seal ring 10 for sealing between relatively rotatable components for example in a gas turbine engine or the like. Annular seals of the kind referred to above may be used for sealing leakage gaps between relatively rotatable components in any type of rotating machinery. Although the invention is particularly useful for sealing between relatively rotatable components, it will also be appreciated that is not its exclusive use. The seal is intended to accommodate a certain amount of transverse or lateral relative movement of the components between which a seal is being effected. Thus, it follows that the seal will remain operative when the components are relatively rotationally stationary so it may be used as a seal between components that are relatively non-rotational but remain capable of relative transverse or lateral movement. Consequently, references to shafts and rotors in the following description are to be construed accordingly.

The full circumference of the annular seal ring 10 is identical to the part of the circumference shown in FIG. 1. The seal ring 10 comprises an annular array of circumferentially spaced and radially movable arcuate seal segments 12 which extend in a continuous end to end relationship in an annular housing 14. The seal segments project radially inwards from the housing 14 for effecting a seal against an engine shaft, as indicated by lines 16, about which the seal is co-axially and concentrically disposed.

Referring now to FIG. 2a, the housing 14 has a generally U-shaped cross-section in the circumferential direction of the seal formed by opposing annular members 18, 20 including a first member or front ring 18 on the upstream, high pressure side and a second member or backing ring 20 on the downstream or lower pressure side. Between them the members 18, 20 define a continuous circumferential channel 22 in the interior of the housing 14 in which the arcuate segments 12 are slidably located. The channel 22 extends radially from the radially outer part of the housing that defines the base of the U to the opening 24 at the radially inner part of the housing. The lower face 25 of the housing 14 is spaced from the surface of the relatively movable component 16 by a distance "c" which thereby defines the leakage gap to be sealed. The axial width dimension of the channel 22 between the respective upstream and downstream axial side faces 26 and 28 of the members 18 and 20 is substantially the same as the width dimension of the segments 12 so that the segments have a sliding fit in the channel 22 in which they are located. Axial movement of the segments 12 within the housing is therefore substantially prevented. The seal segments 12 have a radial depth within channel 22 of "1" and the corresponding radial depth of the U-shaped channel 22 is greater than "1" by at least the maximum radial excursion to be accommodated.

Each of the segments 12 is guided in the channel 22 by an inter-engaging pin and slot arrangement, comprising a radial slot 30 in the segments and an axially extending guide pin 32 carried by the end member plate 20. The slot 30 and pin 32 act to guide the segments in the radial direction of the seal and restrain the segments against circumferential movement within the housing. The segments 12 preferably are radially biased with respect to the housing in this illustration by bias means represented by a spring element 34. The spring element may comprise, for example a circumferential garter spring, positioned between the base of the channel at the closed end thereof and the radially outer end of the respective segment. The springs 34 bias the segments 12 radially inwards towards the shaft 16 or other component against which they seal.

FIG. 2b illustrates the pressure loading experienced by the seal segments 12 due to the pressure differential $\Delta p$ between the pressure $p_{up}$ in the upstream region to the left of the seal segments 12 and the pressure $p_{down}$ in the downstream region to the right of the seal segments. The magnitude and direction of the force exerted by the pressure differential $\Delta p$ is indicated by the size and direction of the arrow in FIG. 2b. As is represented in the drawing, the force is substantial constant across the width of the leakage gap "c" and reduces to zero within the channel 22 with increasing distance inside the housing. The force is uniform around the circumference of component 16 and is directed axially through the leakage gap from the higher pressure, upstream region towards the lower pressure, downstream region. Possible tangential components due to swirl in the vicinity of the leakage gap arising as a result of relative rotation have been ignored for the purposes of this description.

The slot and pin arrangement is illustrated in the view of FIG. 3 which shows a plurality of adjacent arcuate seal segments 12. In the view of FIG. 3, the surrounding detail of the housing is partially cutaway so that the inter-engagement of the pins 32 with the slots 30 can be seen. As shown in FIGS. 3 and 4, the respective circumferential ends of the segments are provided with overlapping end portions 36 so that the circumferential ends of adjacent segments in the seal overlap to form sliding lap type joints. This arrangement enhances the sealing effectiveness of the segmented annular seal, reducing inter-segment leakage flow to a very low, negligible level. The pin and slot guide arrangement, and similarly the bias spring means, are shown as exemplary only. A number of alternatives for each will be apparent to a reader skilled in the art and may be utilised in the described arrangement within the scope of the presently claimed invention.

Improvements to seals of this kind in accordance with the present invention are illustrated the drawings of FIGS. 5 to 9. The basic principal of the invention is illustrated in FIG. 5, and the remaining figures of the drawings show enhancements or variations of features of the invention.

Referring to FIGS. 5a and 5b, the invention has for a major objective the reduction or elimination of pressure loading on seal segments 12 in the direction of main gas flow by the use of pressure balance features acting in the opposite direction to the direction of main gas flow. This is achieved by the provision of a pressure balance cavity, recess or pocket, generally indicated at 38, in the downstream member 20 which thereby provides an upstream directed force to offset some of the pressure loading on the segments 12.

The seal arrangement of FIG. 5a is modified relative to that shown in FIG. 2a by the provision of at least one pressure balance cavity, recess or pocket 38 within the limits of the U-shaped channel 22 on the downstream side of the seal segments 12. Upstream pressure $p_{up}$ is conducted to the cavity 38 through the interior of the housing 14 to the low pressure side of the segments 12.

In the particular embodiment shown in FIG. 5a, the cavity, recess or pocket 38 is provided in the upstream side face 28 of the downstream housing member 20 by increased width (i.e., the dimension in the axial direction) form the base of the channel 22 over most of its radial depth. Only a lip 48 remains at the radially inner circumference of the member 20 to provide a seal against the downstream side of the seal segments 12. The lip 48 effectively forms a secondary seal to prevent, or minimise leakage from the cavity 22, 38. In other embodiments, the cavity 38 comprises a plurality of individual recesses spaced apart circumferentially around the annular channel side face 28. The upstream pressure $p_{up}$ is conducted to the cavity 22, 38 through a plurality of circumferentially spaced passages 40 formed through the upstream side member 18 in the region of the base of the channel 22. The passages 40 convey high pressure air from the high pressure region on the upstream side of the housing 14 to the channel 22 and to the respective recess or recesses 38.

Irrespective of the number of such recesses provided the seal segments 12 are pressure loaded towards the downstream side face 26 of the upstream member 18 during operation. The axial force generated on the seal segments 12 within the channel 22, as shown in FIG. 5b, is thereby effectively balanced, to a greater or lesser extent, to generate a net zero pressure induced force acting on the seal segments 12 over the radial depth of the channel 22. However, there remains an axial force and a moment exerted on the seal segments 12 as a result of the axial force due in the leakage gap "c" due to the pressure differential $\Delta p$.

Considering the segments as sufficiently small for linear approximation: Net pressure side load (N) and moment (M) is, generally given by the equations:

$$N = \int_{-\frac{1}{2}l}^{\frac{1}{2}l} \Delta p\, dx \qquad M = \int_{-\frac{1}{2}l}^{\frac{1}{2}l} \Delta p \cdot x\, dx$$

The net pressure loading (N) without any features, i.e., where the seal segments 12 fit closely within their receiving channel 22 as in the prior art is difficult to determine because the pressures between the faces are not well defined. However, to a first approximation, if the pressure everywhere else is the same, then $N = \Delta p \cdot c$.

In reality the pressure on the whole upstream side is likely to be close to upstream pressure $p_{up}$, and that on the whole downstream side is likely to be close to the downstream value $p_{down}$.

Where there is a linear pressure drop along the unexposed part of the seal segments 12, then $$N = \Delta p \cdot \frac{l+c}{2}$$

where "l" and a "c" are the dimensions indicated in the drawings.

Essentially, prior art segmented seals have a loading which, for a typical segment of order 10 mm length, 1 mm clearance and 1 MPa pressure drop, is of the order of 5500 N/m. If friction is of the order of 0.1, then force required to move a "radially movable segment" is around 550 N/m. The drawback with the prior art, therefore, is that segmented seals cannot be operated effectively at moderate pressures without incurring significant wear against the rotating shaft. In these prior arrangements the moment on the seal segments $$M = \Delta p \cdot \frac{2 \cdot c^2 - c \cdot l - l^2}{12},$$

In arrangements embodying the invention with high pressure fluid fed to the balance region as in FIG. 5a, the force reduces to $$N = \Delta p \cdot c$$

In this case, the net pressure load is of order of 1000 N/m, giving the force required to move a segment as 100 N/m, that is a force five times lower than in an equivalent arrangement according to the prior art. The moment is also reduced to $$M = \Delta p \cdot \frac{c^2 - c \cdot l}{2}.$$

Comparing the two moments there is a reduction in the ratio prior art/invention in the proportion of 9 to 4.5.

In the embodiment of FIG. 6a, in order to offset the load even further, there is provided at least further cavity, recess or pocket 42 on the upstream side of the seal segments 12 vented to the downstream, low pressure region through further pressure communication means 46. The cavity, recess or pocket 42 may be formed as a single annular cavity or recess, or as a plurality of recesses or pockets in the side face 26 of the channel 22, that is in or against the downstream side face 26 of the upstream housing member 18. The radially inner edge of the cavity, recess or pocket 42 is defined by a lip 49 formed on the radially inner edge of the housing member 18. This lip 49 may be arranged at the same radial height as the lip 48 of the opposing housing member 20, but this is not essential and generally is not so arranged.

The pressure communication means 46 comprises a plurality of holes formed in the housing 14. These holes 46 open into the low pressure region on the downstream side of the housing, and in passing through the housing 14 do not intersect the corresponding high pressure communication passages 44 nor the channel 22. The net load can then be reduced to, or close to, zero, by appropriate sizing of the balance pockets 38, 42. The size of the pressure communication passages 46 is relatively unimportant, providing leakage flow rates are sufficiently low or negligible.

FIG. 6b illustrates the forces acting on the seal segments 12 in this arrangement. As before the size and direction of the arrows representing the forces due to the several pressure regions on different parts of the seal segments. The greatest force due to the pressure differential Δp is exerted in the downstream direction over the area of the seal segments exposed in the leakage gap. The force exerted over the area on one side of the seal segments exposed to pressure $p_{bal}$ in the downstream balance pockets 38 is nearly (but not quite) $p_{up}$ and acts in the upstream direction. The force exerted over the area on the opposite side of the seal segments exposed to pressure $p_{vent}$ in the upstream balance pockets 42 is nearly (but not quite) $p_{down}$ and acts in the downstream direction. Although the forces in the pockets 38, 42 act in opposite directions and can be arranged to nearly cancel each other, a net moment due to the radial separation of leakage gap force will remain tending to twist the segments.

However, in general there exists a sealing system comprising a number of carefully chosen balance pockets, and including a staggered relation of pressure communication passages 44,46 spaced apart circumferentially around the seal segments 12 that can, theoretically yield N=0 and M=0 at the same time.

With reference to FIG. 7a, the internal dimensions of the channel 22 are enlarged overall to the depth (i.e., dimension in the axial direction) of the pressure balance pockets. The upstream and downstream pressure balance cavities 42, 38 are created by secondary, circumferentially extending seal means 50 on the upstream side of the seal segments 12, and 52 on the downstream side respectively, and by the radially inner lips 49, 48. The corresponding pressure supply passages 44, 46 are sized appropriately to take account of the expected leakages through the secondary seals, hence $p_{bal}$ is nearly (but not quite) $p_{up}$, $p_{vent}$ is nearly $p_{down}$. An additional space 54 is created in the base of the channel 22 bounded by the secondary seals 50,52. The pressure $p_{spr}$ in this space is close to the mean pressure under the primary seal due to leakage under the secondary seals. Thus, where subscripts "F" and "R" refer to front and rear (in the sense of upstream and downstream) respectively:

$$N = p_{up} \cdot c_F + p_{vent} \cdot d_F + p_{spr} \cdot (l - c_F - d_F) -$$
$$p_{spr} \cdot (l - c_R - d_R) - p_{bal} \cdot d_R - p_{down} \cdot c_R$$

and $$M = p_{up} \cdot c_F \cdot \frac{l - c_F}{2} + p_{vent} \cdot d_F \cdot \left(\frac{l - 2 \cdot c_F - d_F}{2}\right) -$$
$$p_{spr} \cdot (l - c_F - d_F) \cdot \left(\frac{c_F + d_F}{2}\right) + p_{spr} \cdot (l - c_R - d_R) \cdot \left(\frac{c_R + d_R}{2}\right) -$$
$$p_{bal} \cdot d_R \cdot \left(\frac{l - 2 \cdot c_R \cdot d_R}{2}\right) - p_{down} \cdot c_R \cdot \frac{l - c_R}{2}$$

Therefore, by judicious selection of $p_{vent}$, $p_{bal}$, $c_F$, $c_R$, $d_F$ and $d_R$ the force N and moment M on the segments can be minimized over the range of movements expected. The determination of the vent pressure $p_{vent}$ in the upstream cavity 42, and balance pressure $p_{bal}$ in the downstream cavity 38 comes from a mass flow balance of the whole sealing system taking account of the flow through the communication passages 44, 46 and leakage between the segments. FIG. 7b illustrates by the use of arrows indicating the magnitude and direction of the various pressure forces acting over the whole surface of the seal segments.

FIG. 8a shows another embodiment of the invention, similar to that of FIG. 7a in which the secondary seals 50, 52 and 48, 49 comprise large diameter, annular brush seals in which the seal bristles are laid in a cylindrical surface at the seal radius. Otherwise the brush seals may be of conventional construction. FIG. 8b illustrates the forces acting on the seal segments 12. Theoretically this force diagram is identical with the force diagram of FIG. 7b.

As previously mentioned the primary seal formed or carried by the seal segments 12 may comprise one of a number of different types of suitable seal, the range of suitable seals including abradable contact seals, brush seals, leaf seals, airriding seals or the like. In the previous Figures illustrating the invention no specific form of primary seal has been indicated. In FIG. 9a the hatched area 60 indicates how a seal such as a brush seal may be mounted in the seal segments 12 for sealing against a shaft 16. As in the embodiment illustrated in FIG. 8a the secondary seals 50, 52 also comprise brush seals as previously described. The corresponding pressure force diagram is shown in FIG. 9b.

Although aspects of the invention have been described with reference to the embodiments shown in the accompanying drawings, it is to be understood that the invention is not limited to those precise embodiments and that various changes and modifications may be affected without further inventive skill and effort. For example, where particular features have been shown and described in one embodiment it is understood that various combinations of those features with all or some features of other embodiments could be readily achieved without exercising further skill and effort and as such are contemplated by the present invention.

The invention claimed is:

1. A segmented annular seal assembly comprising
an annular seal ring consisting of a plurality of arcuate seal segments disposed end-to-end to form an annular seal operative in use to seal a leakage gap between a fixed part and a relatively rotatable movable part, wherein, in use, there is an upstream pressure region of high pressure on one side of the annular seal and the fixed part and a downstream pressure region of lower pressure on the other side of the annular seal and the fixed part,
the fixed part having an upstream wall and a downstream wall that define a recess within which the seal segments are disposed, the upstream wall and the downstream wall being spaced apart such that the seal segments are free to follow radial movement of the movable part relative to the fixed part, at least a portion of each of the seal segments being in sliding contact with at least a portion of each of an inner face of the upstream wall and an inner face of the downstream wall of the fixed part, the inner face of the downstream wall of the recess being formed with a first pressure balance region within the recess adjacent the downstream side of the seal segments, the inner face of the upstream wall of the recess being formed with a second pressure balance region within the recess adjacent the upstream side of the seal segments, and a first communication passage through the fixed part linking the first pressure balance region in the downstream wall of the recess with the upstream pressure region via an opening in the outer face of the upstream wall, and a second communication passage, separate from the first communication passage, through the fixed part linking the second pressure balance region in the upstream wall of the recess with the downstream pressure region via an opening in the outer face of the downstream wall.

2. A segmented annular seal assembly as claimed in claim 1 further comprising first secondary seal means between the downstream wall of the recess and the seal ring whereby to isolate the first pressure balance region from the downstream pressure region.

3. A segmented annular seal assembly as claimed in claim 2 wherein the first secondary seal means is selected from a group of seal means including lip seals, brush seals, leaf seals, and elastomeric seals.

4. A segmented annular seal assembly as claimed in claim 1 further comprising second secondary seal means between the upstream wall of the recess and the seal ring whereby to isolate the second pressure balance region from the upstream pressure region.

5. A segmented annular seal assembly as claimed in claim 4 wherein the second secondary seal means is selected from a group of seal means including lip seals, brush seals, leaf seals, and elastomeric seals.

6. A segmented annular seal assembly as claimed in claim 4 wherein the first and second pressure balance regions are isolated from each other by secondary seal means within the recess.

7. A segmented annular seal assembly as claimed in claim 1 wherein the first pressure balance region comprises at least one recess or pocket formed in the downstream wall of the recess.

8. A segmented annular seal assembly as claimed in claim 1 wherein the first second pressure balance region comprises at least one recess or pocket formed in the upstream wall of the recess.

9. A segmented annular seal assembly as claimed in claim 1 wherein the arcuate seal segments are biased towards the relatively rotatable part.

10. A segmented annular seal assembly as claimed in claim 1 wherein the annular seal ring is selected from a group of seal means including abradable contact seals, brush seals, leaf seals, and air-riding seals.

* * * * *